United States Patent [19]

Hu et al.

[11] Patent Number: 5,262,621
[45] Date of Patent: Nov. 16, 1993

[54] INSTANT HOT WATER APPARATUS UTILIZING ELECTROMAGNETIC INDUCTION HEATING

[75] Inventors: Tien-Cheng Hu; Yin-Chin Wu, both of Chutung, Taiwan

[73] Assignee: Industrial Technology Research Institute

[21] Appl. No.: 817,655

[22] Filed: Jan. 7, 1992

[51] Int. Cl.$^5$ .............................................. H05B 6/06
[52] U.S. Cl. ................................ 219/10.51; 219/10.77
[58] Field of Search ............... 219/10.77, 10.51, 10.65, 219/10.55 A; 392/316

[56] References Cited

U.S. PATENT DOCUMENTS

| | | | |
|---|---|---|---|
| 1,802,660 | 4/1931 | Maxim et al. | 392/316 |
| 2,513,779 | 7/1950 | Bailey | 219/10.51 |
| 3,809,856 | 5/1974 | Wills | 392/316 |
| 4,358,652 | 11/1982 | Kaarup | 219/10.55 A |
| 4,417,116 | 11/1983 | Black | 219/10.55 A |
| 4,467,165 | 8/1984 | Kiuchi et al. | 219/10.77 |
| 4,560,849 | 12/1985 | Migliori et al. | 219/10.51 |

Primary Examiner—Philip H. Leung
Attorney, Agent, or Firm—Pollock, Vande Sande & Priddy

[57] ABSTRACT

An instant hot water apparatus utilizing electro-magnetic induction heating. The apparatus includes a container having an outlet. A solenoid valve is connected to the outlet of the container. The first end of a water conduit with a first end and a second end is connected to the solenoid valve. An electro-magnetic induction heating coil surrounds the water conduit between its ends and is capable of producing an alternating magnetic field. A water outlet valve is connected to the second end of the water conduit. A water temperature detecting device disposed on the water conduit can generate a water temperature signal. A water level detecting device is disposed on the container and can generate a water level signal. A power control device supplies electric power. A supervising and controlling device is connected to the power control device and to the solenoid valve and is capable of transmitting an adjustable oscillation frequency. The water temperature and level signals are sent to the supervising and controlling device. The signal input is connected to the supervising and controlling device for receiving the oscillation frequency. A microswitch is connected to the water outlet. When the water outlet valve is activated, the microswitch transmits a signal to the power control device to supply electric current to the supervising and controlling device.

12 Claims, 4 Drawing Sheets

INSTANT HOT WATER APPARATUS UTILIZING ELECTROMAGNETIC INDUCTION HEATING

FIELD OF THE INVENTION

The present invention relates generally to a hot water apparatus, and particularly to an instant hot water apparatus having an improved heating device.

BACKGROUND OF THE INVENTION

Electric hot water apparatuses are very popular nowadays. The known hot water apparatuses usually have a container for holding water as well as a thermal device for keeping the water hot.

Coffee lovers or tea lovers all know that the hotter the water used in making coffee or tea, the better the flavor brought out from it. However, it is very difficult for a conventional hot water apparatus to maintain the water hot for a considerable period of time, no matter how efficient its thermal device is. In other words, known hot water apparatuses cannot satisfy real coffee lovers and tea lovers.

In conventional hot water apparatuses, no matter how much water is in the water container, it requires a rather long time to heat up the water. This problem is mainly due to the drawbacks in conventional hot water apparatuses described below:

The heating principle of the conventional hot water apparatus is to heat water by high temperature produced by electric current passing through a resistance wire. To avoid the danger of electric shock to users due to electric conduction caused by the direct contact of water and resistance wire, the outer surface of the resistance wire must be treated with an insulating material. The overall structure of the heating unit is as shown in FIG. 1.

Generally, the resistance wire (1) is made in the form of a spiral and placed in the center of a metallic tube (3); between the resistance wire (1) and the metallic tube (3) is filled with electric insulating material (2). When electric current is supplied, the resistance wire (1) transmits heat to the water (4) through the insulating material (2) and the metallic tube (3). Since the heat conductivity of the resistance wire (1) is generally small, the effect of heat conduction of the resistance wire is not very ideal.

It can be observed from the above description of the heating unit in conventional hot water apparatuses that the heat conductivity of the resistance wire (1) is very low and cannot instantly heat up the water in the container. Furthermore, if the resistance wire (1) is designed to be longer in order to increase heat conduction, there must be a very long heating zone. Consequently, a large amount of electricity is required to heat the water and the hot water apparatus must be large enough to contain such a heating unit. As a result, such a hot water apparatus is very uneconomical and hardly a merchandizable product.

The above-mentioned problems have existed for a very long time, but no effective solution has been offered.

The theory of heating the tubular metallic body in a hot water apparatus by utilizing the electro-magnetic induction heating coil has been disclosed in the book entitled "Elements of Induction Heating" P. 23, FIG. 2.12, published in 1988 (Electric Power Research Institute, Inc., Palo Alto, Calif. 94303). The assembly theory of an electro-magnetic induction heating coil and tubular metallic body has also been disclosed in the book entitled "Induction Heat Treatment of Steel" P. 55, FIG. 3.3, published in 1986 (American Society for Metals, Metals Park, Ohio 44073). But, there are many difficulties in applying these theories in the making of hot water apparatuses, and up to now, no hot water apparatus adopting these theories has been successfully developed and sold on the market. The present invention has solved some of the difficulties, such as the problems of controlling the water temperature and instantly heating up the water to be flowed out to boiling point, among others, thus accomplishing a merchandizable hot water apparatus.

SUMMARY OF THE INVENTION

The primary object of the present invention is to provide a hot water apparatus which is capable of instantly heating up water and does not need a very long conduit for heating.

The method of heating according to the present invention adopts the theory of the electro-magnetic induction heating coil to produce heat directly in the water flowing out of the apparatus which is evidently different from the methods disclosed in the prior art. According to the structure of the present invention, during the heating process, it is not necessary to use any material as a heat conductor for the heating element; hence, the heat loss is very low. Furthermore, the heat required is only for heating up the water flowing out; hence the utilization of energy is directly effective; and no matter how long the user presses the tap, he/she can still obtain sufficiently hot water.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT(S)

Figure 1:
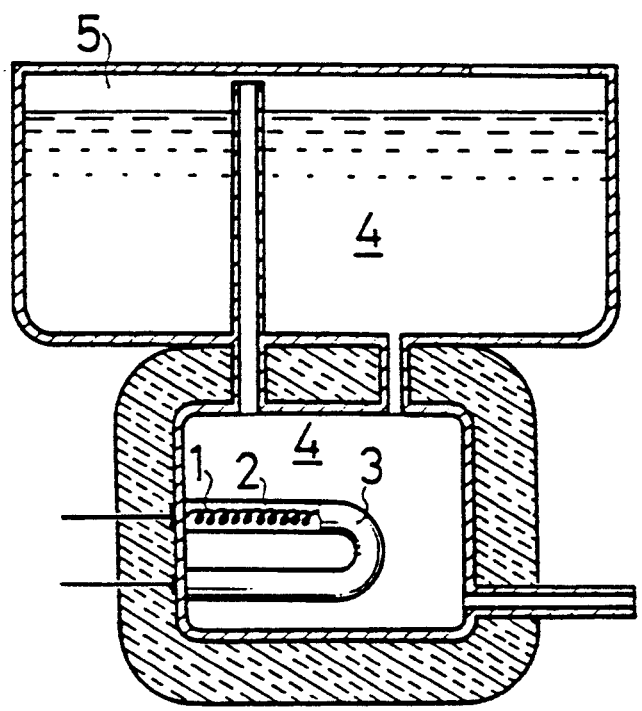
FIG. 1 is a schematic view of the heating unit of the conventional hot water apparatus.
Figure 3:
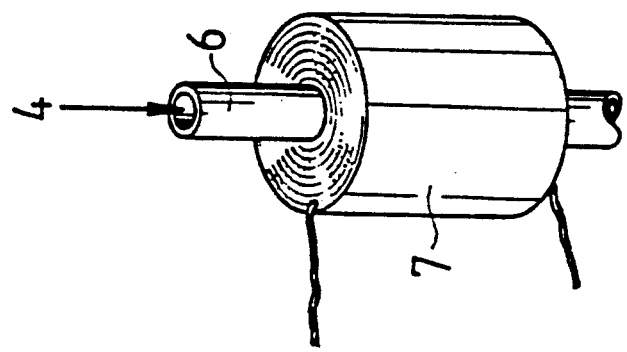
FIG. 3 is the external view of the heating unit of the hot water apparatus of the present invention.
Figure 2:
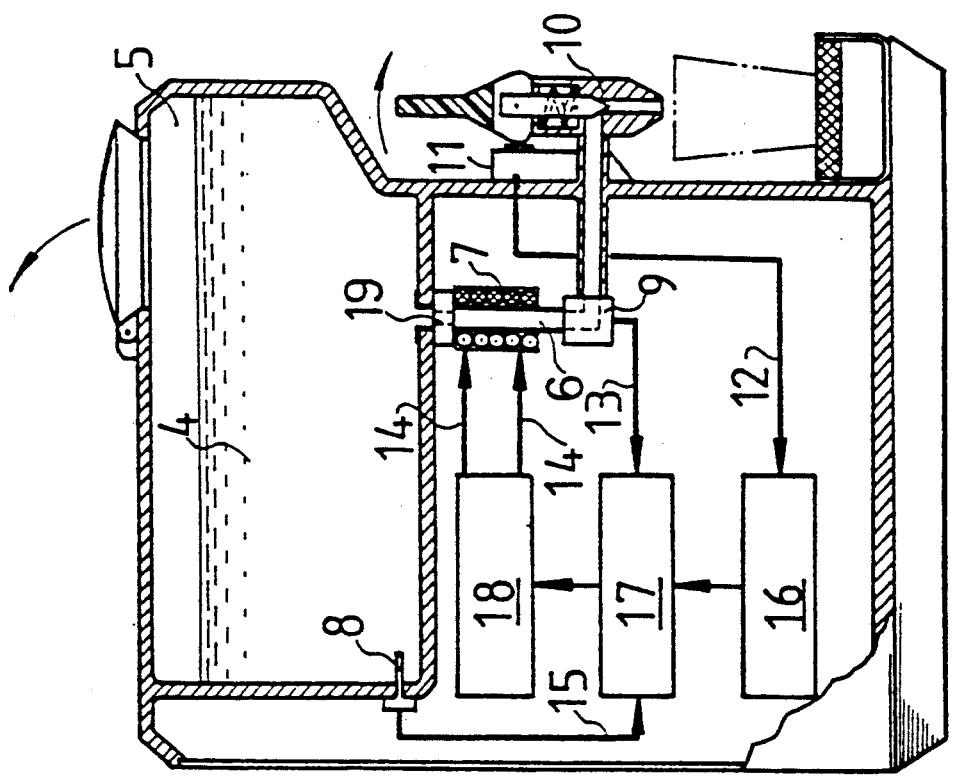
FIG. 2 is a schematic view of the structure of the hot water apparatus of the present invention.
Figure 5:
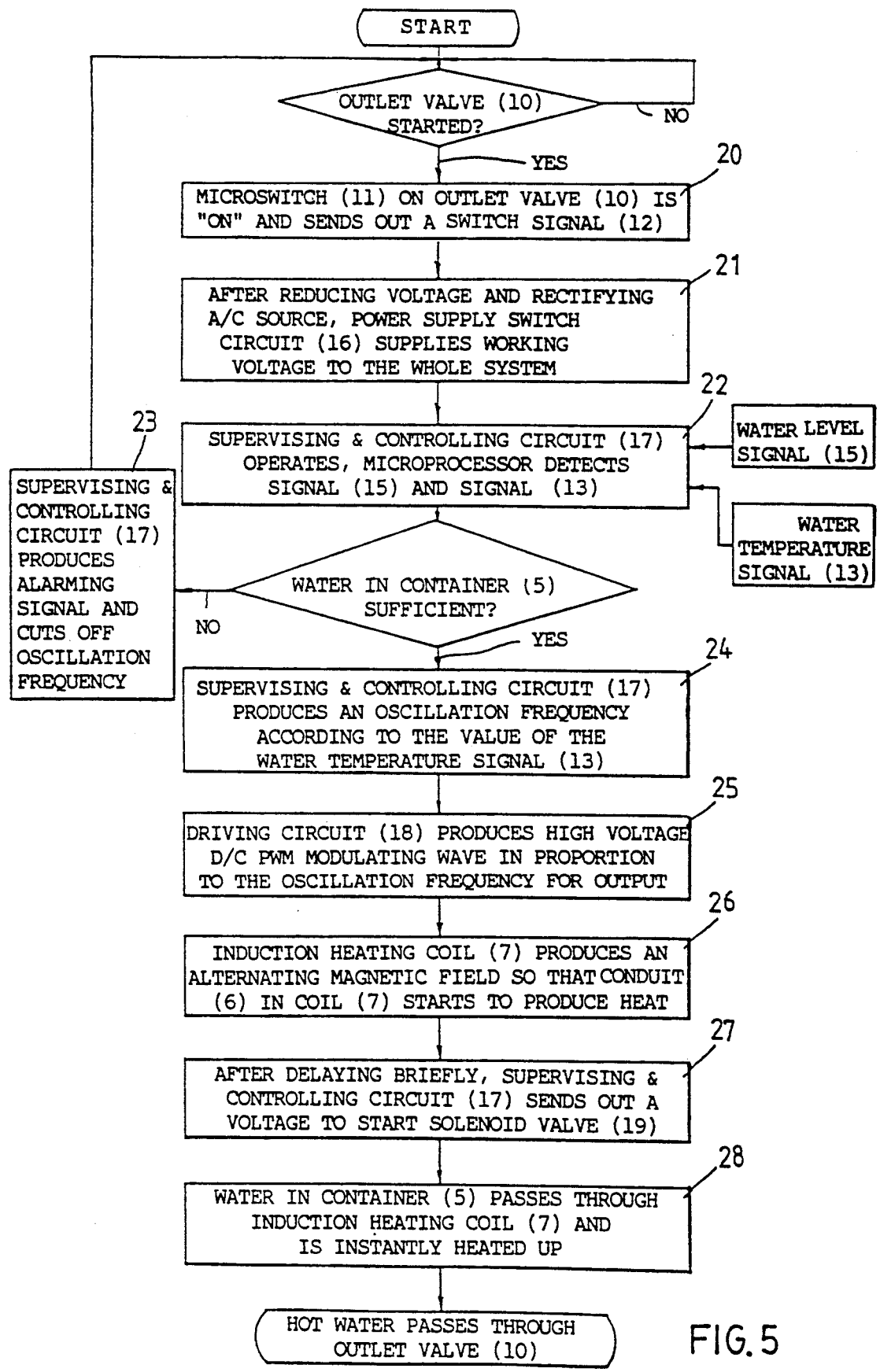
FIG. 5 is a flow diagram.

As seen in FIG. 2, the hot water apparatus of the invention comprises a container (5) for storing water (4), having an outlet (51) connected to an electro-magnetic valve and passing through the center of an electromagnetic induction coil (7) by means of a metallic tube (6) and connected to an outlet valve (10). Provided in the hot water apparatus, there is a supervising and controlling system performing the following steps (referring to FIG. 5):

1. Outputting a signal (12) when the outlet valve (10) is started; this signal may be transmitted by a microswitch (11) linking up with the outlet valve (10)—Step 20;

2. Commutating a power switch circuit (16) to supply power to all the elements requiring it—Step 21;

3. Collecting a water level signal (15) and a water temperature signal (13)—Step 22;

4. When the water level is too low, sending a signal to a supervising and controlling circuit (17) to produce an alarm signal and instantly stopping the generation of an oscillation frequency—Step 23;

5. Causing the supervising and controlling circuit (17) to output a variable oscillation frequency—Step 24;

6. The supervising and controlling circuit (17) activating a driving circuit (18) to produce high voltage direct current PWM (Pulse Width Modulation) for outputing modulating wave according to the oscillation frequency—Step 25;

7. Transmitting the modulating wave to the electro-magnetic induction heating coil (7) to produce an alternating magnetic field so that the water conduit (6) in the heating coil (7) produces heat—Step 26;

8. After delaying for a short period of time, the supervising and controlling circuit (17) driving the circuit of the solenoid valve (19) open—Step 27; and 9. Water in the container (5) flowing through the conduit (6) in the induction coil (7) being heated up and discharged from the outlet valve (10)—Step 28.

In the schematic view as shown in FIG. 2, the main structure of the instant hot water apparatus according to the present invention comprises: a container (5) for storing water (4), having an outlet (51). A metallic water conduit (6) sends the water from the container (5) through the solenoid valve (19) and a heating coil (7) to the outlet valve (10) at the end of the conduit solenoid valve. The (19) is connected to the outlet (51) of the container (51). An electro-magnetic induction heating coil (7) surrounds the central part of the water conduit (6) for heating up the water conduit (6). An outlet valve (10) is connected to the end of the water conduit (6) for discharging the heated water. A microswitch (11) connected to the outlet valve (10) is caused to output a signal when the outlet valve (10) is opened. A power switch circuit (16) is provided for supplying electric power. A supervising and controlling circuit (17) including mainly a micro-processing system (or CPU, Central Processing Unit) is included for detecting water level and water temperature and determining commands. The present invention also includes a driving circuit (18) for executing the commands from the supervising and controlling circuit (17).

When the outlet valve (10) is pressed down, the power switch circuit (16) receives a switch signal (12) provided by the microswitch (11) and starts action. The switch circuit sends a signal to the supervising and controlling circuit (17), which is the main circuit of the overall system. The supervising and control circuit utilizes the water level signal (15) given by a water level gauge in the container (5) to supervise the water quantity in the container (5). The supervising and control circuit also utilizes the temperature sensor (9) on the water conduit (6) to control the water temperature of the water conduit (6). The temperature sensor (9) is preferably installed on the water conduit (6) between the electro-magnetic induction heating coil (7) and the outlet valve (10). If the outlet valve (10) is not pressed, the solenoid valve (19) remains in an "OFF" state and the water in the container (5) will not flow out; hence the user may avoid drinking insufficiently hot water.

Analyzing the water level signal (15) given by the water level gage (8) and the temperature signal (13) given by the temperature sensor (9), the supervising and controlling circuit (17) produces a control signal to the driving circuit (18). In response, the driving circuit outputs an alternating current (14) proportional to the control signal to the electro-magnetic induction heating coil (7). The heating coil then sets up an alternating magnetic field proportional to the input current. According to Faraday's Law, the cutting of the alternating magnetic field by the line of magnetic force causes the water conduit (6) disposed in the electro-magnetic induction heating coil (7) to produce an eddy current which is then converted into heat energy to supply heat. After delaying several ten milli seconds, the supervising and controlling circuit (17) sends out a voltage to the solenoid valve (19), which is then switched "ON", allowing the water in the container (5) to start to flow out when passing through the water conduit (6) in the induction heating coil (7), the water is instantly heated up, thus supplying hot water. The reaction time from the moment the outlet valve (10) is pressed down to produce a switch signal (12) to the water conduit (6), producing an eddy current which is then converted into heat energy may be very short. As in the design of the present invention, the reaction time for the overall process is very short, only about 100-200 milli seconds.

Figure 4:
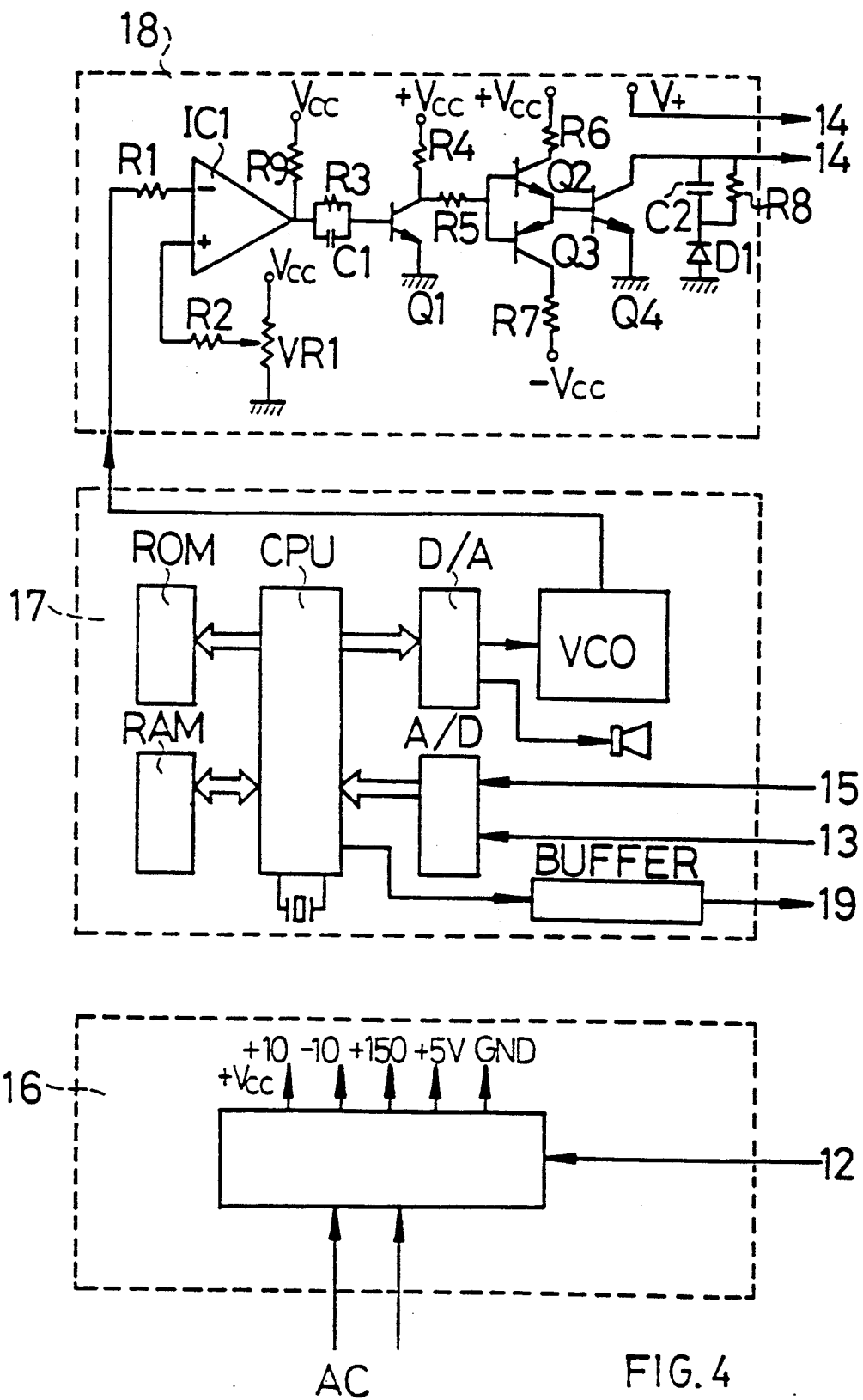
FIG. 4 is a preferred embodiment of the control circuit for the heating unit of the hot water apparatus of the present invention.

The circuits controlling the electro-magnetic induction heating coil (7) as shown in the preferred embodiment of FIG. 4 are:

(1) Power Supply Switch Circuit (16)

This circuit is responsible for supplying power to the whole system of the hot water apparatus. The start of the power supply switch circuit is controlled by the switch signal (12) transmitted from the microswitch (11) attached onto the outlet valve (10). After the starting of the power switch circuit (16), the alternating current is reduced through a transformer and then rectified to transmit various voltages and power supply required by the whole system of the hot water apparatus in order to activate the whole system.

(2) Supervising & Controlling Circuit (17)

This circuit mainly consists of a microprocessor (CPU), and integrated circuits (IC) of ROM, RAM, A/D, and D/A among others After receiving power supply (+5V), the supervising and control circuit starts to operate. Firstly, the temperature signal (13) and the water level signal (15) are transferred to the CPO through the A/D and determined by the program prerecorded in ROM as shown in the flow diagram in FIG. 5). A corresponding signal is then transmitted from the CPU to the D/A. The corresponding signal is converted into a corresponding analog voltage for controlling the voltage controlled oscillator (VCO) in order to produce an oscillation frequency according to the voltage value.

In general, when the temperature signal (13) given by the temperature sensor (9) indicates that the temperature of the water in the water conduit (6) is lower than the pre-determined value, the CPU will output a higher voltage so that the voltage controlled oscillator (VCO) will produce a higher oscillation frequency. On the other hand, if the temperature signal (13) indicates that the water temperature is higher than the predetermined value, then the CPU will output a lower voltage so that the oscillation frequency produced by the VCO will be lowered accordingly.

When the water level gauge (8) disposed in the water container (5) detects that the water level is lower than the minimum level, the water level gauge (8) will produce a water level signal (15). After receiving the level signal, CPU will produce an intermittent signal through the D/A to a megaphone to send out an alarm signal. Simultaneously the control voltage of the voltage controlled oscillator is out off so that no oscillation frequency will be produced. It follows that the solenoid valve (19) will be maintained in an "OFF" stae becasue the input voltage is cut off. Accordingly, the water in the container (5) will not flow out. Thus, the protective function of the present invention is achieved.

(3) Driving Circuit (18)

This circuit is a power output unit. IC1 is a comparison apparatus composed of a magnifying calculator for comparing the oscillation frequency provided by the supervising and controlling circuit (17) with a fixed value. The comparison is performed in order to produce a series of pulse width modulation (PWM) for driving a power output circuit composed of Q1, Q2, Q3 and Q4 to output a direct current of 150 volts in the manner of pulse width modulation (PWM) so as to produce an alternating current to the electro-magnetic induction heating coil (7). The heating effect can then be achieved.

Although the present invention has been illustrated and described with reference to the preferred embodiments thereof, it should be understood that it is in no way limited to the details of such embodiments, but is capable of numerous modifications within the scope of the appended claims.

We claim:

1. An instant hot water apparatus utilizing electromagnetic induction heating, said apparatus comprising:
    a container for storing water, said container having an outlet;
    a solenoid valve connected to said outlet;
    a water conduit having a first end and a second end, said solenoid valve being connected to said first end;
    an electro-magnetic induction heating coil surrounding said water conduit between said first end and said second end of said water conduit and being capable of producing an alternating magnetic field;
    a water outlet valve connected to said second end of said water conduit;
    a water temperature detecting device disposed on said water conduit and being capable of generating a water temperature signal;
    a water level detecting device disposed on said container and being capable of generating a water level signal;
    a power control device for supplying electric power;
    a supervising and controlling device connected to said power control device to obtain power supply, said supervising and controlling device also being connected to a coil of said solenoid valve, said supervising and controlling device being capable of transmitting an adjustable oscillation frequency; said water level detecting device being sent to said supervising and controlling device including means for receiving said water temperature signal and said water level signal;
    a driving device being capable of producing high voltage direct current PWM modulating wave, said driving device including a signal input and a signal output, wherein said signal input is connected to said supervising and controlling device for receiving said oscillation frequency, and said signal output is connected to said electromagnetic induction heating coil; and
    a microswitch connected to said water outlet valve, wherein due to a connection to said water outlet valve, when said water outlet valve is activated, said microswitch transmits a signal to said power control device to simultaneously supply electric current to said supervising and controlling device.

2. The hot water apparatus according to claim 1, wherein said supervising and controlling device outputs an oscillation frequency to said driving device, and after delaying for a short period of time, outputs another signal to said solenoid valve to cause said solenoid valve to open.

3. The hot water apparatus according to claim 2, further comprising an alarm device connected to said supervising and controlling device.

4. The hot water apparatus according to claim 1, further comprising an alarm device connected to said supervising and controlling device.

5. The hot water apparatus according to claim 4, wherein said water temperature detecting device is connected to said water conduit.

6. The hot water apparatus according to claim 4, wherein said water temperature detecting device is disposed on said water conduit between said electro-magnetic induction heating coil and said water outlet valve.

7. A method of instantly producing hot water in an apparatus utilizing electro-magnetic induction heating comprising a container for storing water and connected to a solenoid valve via a water conduit, said water conduit passing through the center of an electro-magnetic induction heating coil and connected to a water outlet valve; and a supervising and controlling system being disposed in said hot water apparatus, said method comprising the steps of:
    (a) opening said water outlet valve;
    (b) the opening causing a switch signal to be transmitted to a power switch circuit, said switch signal causing said power switch circuit to send power to the apparatus;
    (c) causing said supervising and controlling circuit to output a variable oscillation frequency;
    (d) activating a driving circuit to produce a high voltage direct current PWM modulating wave and transmitting said modulating wave to said electro-magnetic induction heating coil to produce an alternating magnetic field; and
    (e) after delaying for a short period of time, causing a circuit of said solenoid valve to open.

8. The method according to claim 7, wherein said switch signal is produced by a microswitch connected to said water outlet valve.

9. The method according to claim 7, wherein said hot water apparatus further includes a water level gauge and said method further comprises the step of transmitting a water level signal by said water level gauge to said supervising and controlling circuit prior to the transmission of said oscillation frequency from said supervising and controlling circuit.

10. The method according to claim 9, wherein said hot water apparatus further comprises an alarm device, wherein when said water level signal received by said supervising and controlling circuit indicates low water level, said supervising and controlling circuit transmits an alarm signal to activate said alarm device.

11. The method according to claim 7, wherein said hot water apparatus further includes a water temperature sensor and said method further comprises the step of the transmission of a water temperature signal by said water temperature sensor to said supervising and controlling circuit as a reference value for adjusting said output oscillation frequency prior to the transmission by said supervising and controlling circuit of said oscillation frequency.

12. The method according to claim 11, wherein said water temperature signal received by said supervising and controlling circuit is transmitted by said water temperature sensor from said water conduit between said electro-magnetic induction heating coil and said water outlet valve.

* * * * *